United States Patent
De Waal

[11] Patent Number: 5,673,947
[45] Date of Patent: Oct. 7, 1997

[54] DEVICE FOR BUTT JOINING OF DUCTS FOR CARRYING GASEOUS MEDIUM AND HAVING A RECTANGULAR OR SQUARE CROSS SECTION

[75] Inventor: Casparus Wilhelmus De Waal, Deurne, Netherlands

[73] Assignee: De Waal Staal B.V., Helmond, Netherlands

[21] Appl. No.: 425,496

[22] Filed: Apr. 20, 1995

[30] Foreign Application Priority Data

Apr. 22, 1994 [NL] Netherlands ............................ 9400651
Jan. 24, 1995 [NL] Netherlands ............................ 9500127

[51] Int. Cl.$^6$ .................................................. F16L 17/06
[52] U.S. Cl. ........................ 285/364; 285/424; 285/910
[58] Field of Search .............................. 285/364, 424, 285/910, 405, 915, 291; 411/82

[56] References Cited

U.S. PATENT DOCUMENTS

| | | | |
|---|---|---|---|
| 2,775,917 | 1/1957 | Ferguson | 411/82 X |
| 3,460,859 | 8/1969 | Keating | 285/424 X |
| 3,630,549 | 12/1971 | Grimm | 285/424 X |
| 3,923,326 | 12/1975 | Mez | 285/363 |
| 4,049,298 | 9/1977 | Foti | 285/424 X |
| 4,732,412 | 3/1988 | Linden et al. | 285/915 X |
| 5,022,688 | 6/1991 | Arnoldt | 285/424 X |
| 5,133,580 | 7/1992 | Meinig | 285/424 X |
| 5,165,736 | 11/1992 | De Waal | 285/424 |
| 5,195,789 | 3/1993 | Walsh et al. | 285/424 X |

FOREIGN PATENT DOCUMENTS

| | | |
|---|---|---|
| 2408784 | 6/1979 | France . |
| 2221312 | 11/1973 | Germany . |
| 9012827 | 1/1991 | Germany . |
| 8503491 | 7/1987 | Netherlands ............ 285/363 |

Primary Examiner—Dave W. Arola
Attorney, Agent, or Firm—Banner & Witcoff, Ltd.

[57] ABSTRACT

The invention relates to a device for butt joining of ducts for carrying gaseous medium, the ducts having a rectangular or square cross section, wherein a profile is fixed along the free end edges of a duct, which profile comprises: an end wall standing perpendicularly on the duct wall; a flange for fixing the duct wall, a hook-shaped member the legs of which extend along the rear side of the end wall of the profile, such that at least the mutually facing front sides of two mutually opposite hook-shaped members of ducts to be connected can be fixed to each other, and wherein a deformable sealing means is arranged on the rear side of the hook-shaped member facing toward the duct wall.

15 Claims, 5 Drawing Sheets

DEVICE FOR BUTT JOINING OF DUCTS FOR CARRYING GASEOUS MEDIUM AND HAVING A RECTANGULAR OR SQUARE CROSS SECTION

The invention relates to a device for butt joining of ducts for carrying gaseous medium and having a rectangular or square cross section, wherein a profile is fixed along the free end edges of a duct, which profile comprises: an end wall standing perpendicularly on the duct wall; a flange for fixing to the duct wall, in addition to a hook-shaped member, the legs of which extend along the rear side of the end wall of the profile, this such that at least the mutually facing front sides of two mutually opposite hook-shaped members of ducts to be connected can be fixed to each other.

Devices of the type described in the preamble serve for gas-tight connection of ducts carrying gaseous medium, so that it is required that the connecting profiles and hook-shaped members are arranged such that no leakage occurs over the connection. In a known device the connecting profile comprises the end wall in addition to a rear wall which together form a leg of the L-shape profile, which leg stands perpendicularly to the duct wall, and further the flange and a second flange parallel to this first one, wherein the first and the second flange together form the other leg of the L-shaped profile, wherein the duct wall comes to lie in between these flanges. By means of a fold in the end wall of the profile directed toward the inside of the profile a partition is formed in the interior of the profile between the space for accommodating the duct wall and the space in which the associated hook-shaped members are inserted on either side of the profile. A sealing strip is placed over the entire length of the profiles between the mutually facing end walls of profiles which are fixed to ducts, which are to be joined together.

Such a device has the drawback that leakage can occur along the edge of the inner corner of the hook-shaped member, the fold directed toward the inside of the profile and a leg of the hook-shaped member when the fold does not make gas-tight connection to the rear wall of the profile. Leakage can further occur when the hook-shaped member does not make gas-tight connection to the end edge of the duct.

The invention has for its object to obviate the above stated drawbacks and provides to this end a device which is distinguished in that a deformable sealing means is arranged on the rear side of the hook-shaped member facing toward the duct wall.

According to a further property of the invention the body of the hook-shaped member extends in front of the end edge of the duct.

Another property of the invention is that the first flange is formed by two layers, the one layer of which is connected to the second flange and the other layer to the rear wall, wherein the end wall is connected to a rearward directed third flange which is placed between the two layers.

A device according to the present invention has the advantage that the space inside the duct and the space outside the duct are separated gas-tightly. A gas-tight connection is therefore obtained directly with assembly of a device according to the invention.

The invention is further elucidated with reference to the figure description following hereinafter of an embodiment of the invention. In the drawings.

Reference is made in the figures to the same components with the same reference numeral.

Figure 1:
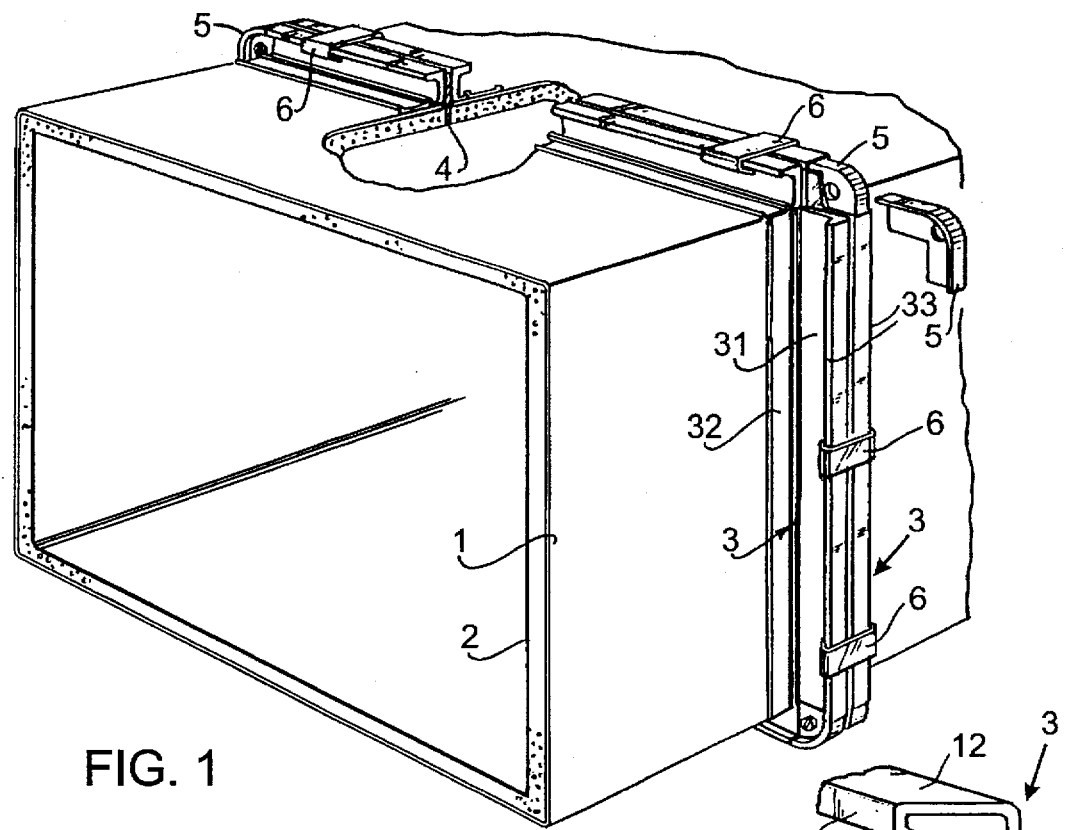
FIG. 1 shows a perspective view of a part of a duct for guiding gaseous medium with a connecting profile according to the invention.

The device according to the present invention shown in FIG. 1 comprises: a duct wall 1; an insulating layer 2; connecting profiles 3; a sealing strip 4; hook-shaped members 5; and closing profiles 6.

FIG. 1 shows that the duct pieces 1 are butt joined to each other so that a smooth join is created on the inside of the duct. This join is formed by arranging on the free end edges of ducts 1 substantially L-shaped profiles 3, whereof the hollow legs 31 lying perpendicularly on the duct wall are opened on either end of each profile 3 for insertion therein of hook-shaped members 5, wherein hook-shaped members 5 placed against each other are mutually fixed, and whereof the other legs 32 are opened over the entire length of profile 3, wherein the duct wall 1 is located in the other legs 32. This will be further discussed below.

In order to ensure that the profiles 3 are pressed firmly against the sealing strip 4 arranged between the profiles 3, closing profiles 6 are clamped over shoulders 33 arranged on the end of the hollow legs 31.

Figures 2, 3:
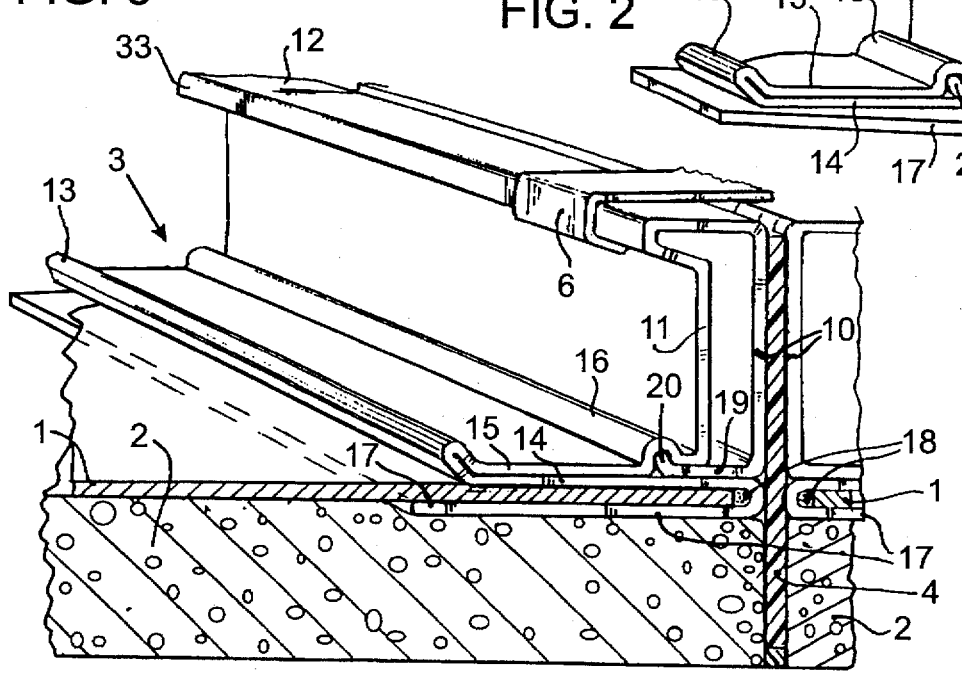
FIG. 2 is a perspective view of an embodiment of a profile according to the invention.
FIG. 3 is a perspective view of a section of the connection with the profile according to the present invention shown in FIG. 2.

The profile according to the present invention shown in FIG. 2 comprises: an end wall 10; a rear wall 11; a first flange 13; a second flange 17; and a third flange 19.

The end wall 10 is fixed by means of the connecting strip 12 to the rear wall 11, wherein the connecting strip 12 is wider than the distance between end wall 10 and rear wall 11. In this manner the shoulder 33 is formed. The rear wall 11 is fixed to the first flange 13 which is formed by two layers 14, 15, wherein the one layer 14 is fixed to the second flange 17 and the other layer 15 is fixed to the rear wall 11. The edge of end wall 10 is bent over such that a third flange 19 is formed which is inserted between the two layers 14, 15 of the first flange. In the other layer 15 of the first flange 13 is arranged a bulge 16 in which is received a bent-up edge strip 20 of the third flange 19.

FIG. 3 shows that the duct wall 1 comes to lie between the one layer 14 of the first flange 13 and the second flange 17, wherein the second flange 17 is biased toward the first flange 13 so that the duct wall 1 is clamped fixedly against a sealing means 18 between the first flange 13 and the second flange 17. The space in the inside of the duct and the space between end wall 10 and rear wall 12 of profile 3 are therefore mutually separated in gas-tight manner so that a gas cannot escape along a path between the second flange 17 and the duct wall 1 and along a hook-shaped member 5 via the space between end wall 10 and the rear wall 11. If desired, the profile 3 can be fixed to the duct wall 1 by applying an adhesive means between the duct wall 1 and the first flange 13 and/or the second flange 17, or by fixing at least one of these flanges 13, 17 to the duct wall 1 by means of for instance point welding.

The second flange 17 is arranged between duct wall 1 and insulation material 2, wherein the insulation material 2 is attached by means of an adhesive to the outer surface of the second flange 17. Placed between the end walls 10 of profiles fixed to duct pieces for joining is a sealing strip which extends as far as the surface of the insulation material 2 facing toward the interior of the duct.

Figure 4:
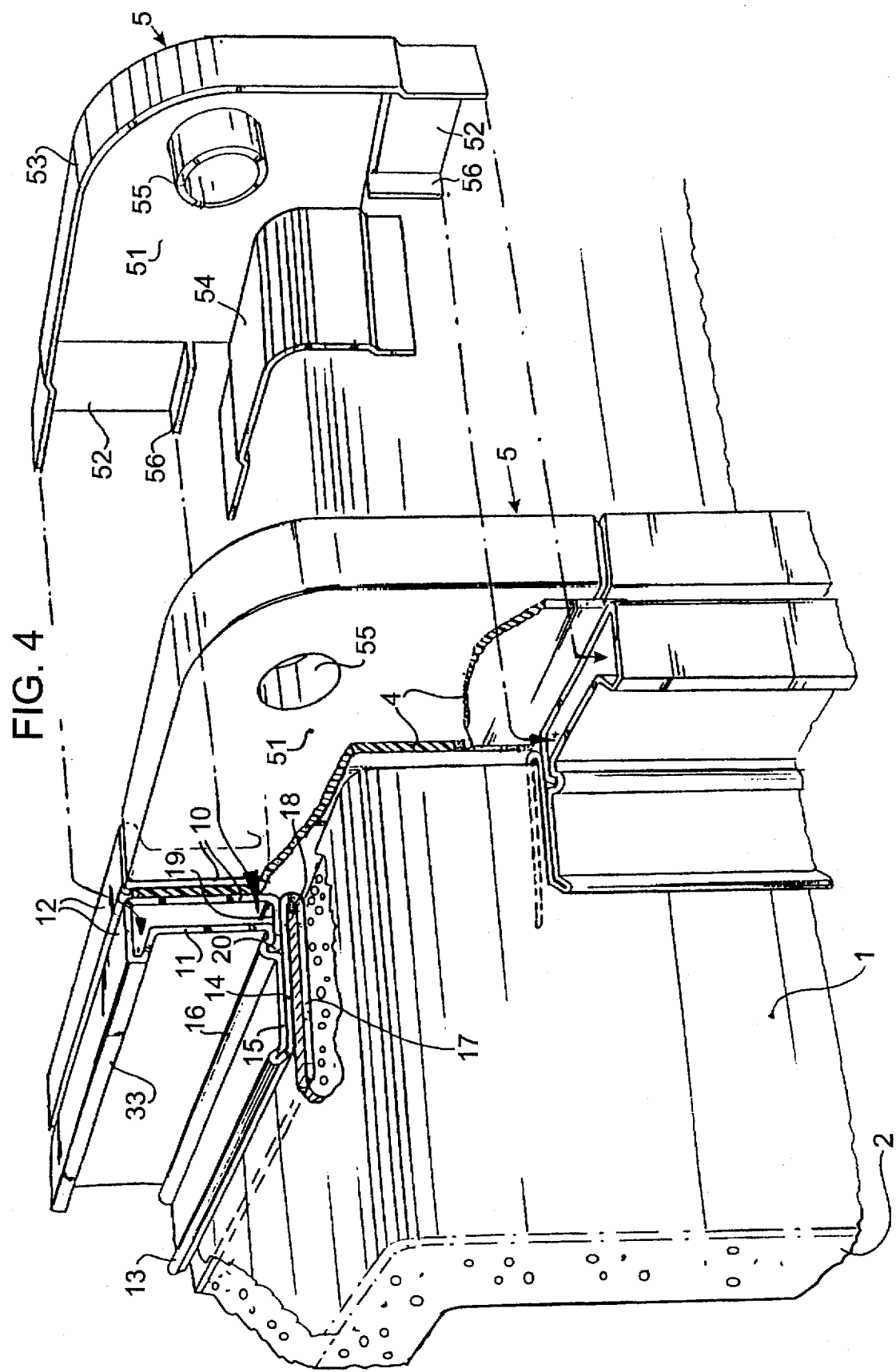
FIG. 4 shows a partly cut away perspective view of the connection at the corner of a duct piece according to the present invention.

Shown in FIG. 4 is a partially disassembled connection, wherein the hook-shaped member 5 comprises: a body 51; legs 52; an outer flange 53; and an inner flange 54.

The legs 52 of the hook-shaped member 5 which are attached to the body 51 enclose a right angle and are inserted into the profile 3 when the connection is formed. The outer flange 53 is fixed to the outer edge of the body 51 and the legs 52, wherein the portions of this flange fixed to the legs 52 are received in the shoulder 33 of profile 3, and wherein the width of the outer flange 33 corresponds with the inner dimensions of profile 3 between end wall 10 and shoulder 33.

The inner flange is only fixed to the body 51, wherein when the connection is formed this inner flange 54 extends along the edge of the duct between the second flange 17 of the profile and the insulation material 2 and is arranged in the corner between the duct wall 1 and insulation material 2.

Further arranged in the body 51 of the hook-shaped member is a hole 55, wherein the holes 55 of hook-shaped members 5 for fixing to each other are placed in line when a connection is formed and a fastening element (not shown) is arranged through the holes 55. Various components per se known in the art can be used as fastening element, such as for instance a bolt and a nut or a pop rivet.

On the walls of legs 52 located closest to the duct wall 1 strips 56 are arranged perpendicularly on legs 52, the width of which strips corresponds with the distance between the end wall 10 and the rear wall 11 of the profile 3, so that the legs 52 of each hook-shaped member 5 are firmly clamped in the interior of profile 3.

Figure 5:
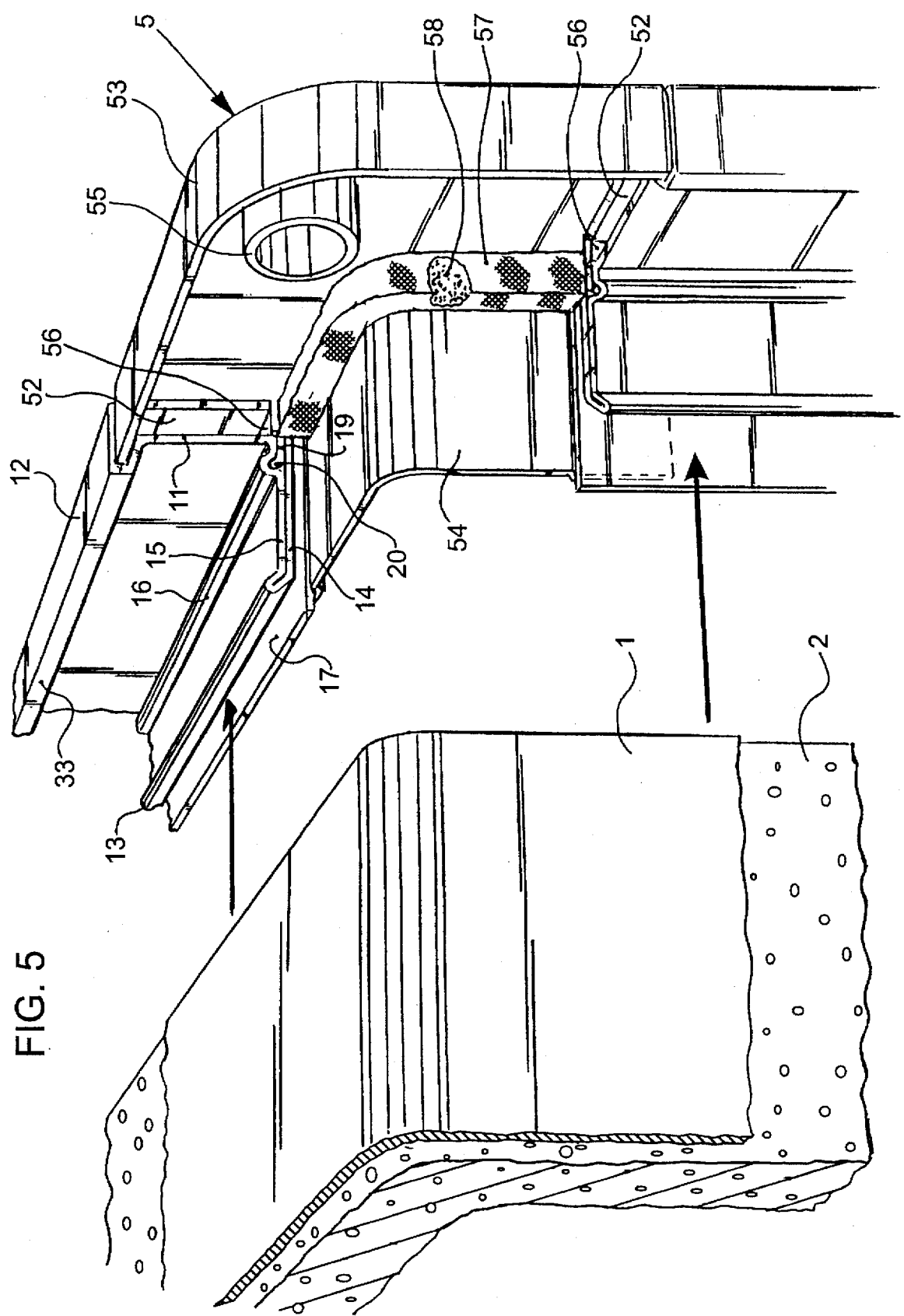
FIG. 5 shows a perspective view of a disassembled connection with another embodiment of the hook-shaped member.

Shown in FIG. 5 is the manner in which profiles 3 are arranged on the duct wall 1. Use is made herein of another embodiment of hook-shaped member 5 which serves to mutually connect the profiles 3. The form of the hook-shaped member 5 is the same as that shown in FIG. 4 but further comprises: an envelope 57; and a paste 58.

In this embodiment of the invention the envelope 57 in which the paste 58 is arranged is cushion-shaped and is mounted on the inner flange 54 against the body 51 of the hook-shaped member 5. In the embodiment of the present invention depicted in this figure the envelope 57 extends along the inside corner of the body 51 as far as the legs 52.

In order to form joins of duct pieces, profiles 3 are first mutually fixed by inserting the legs 52 of hook-shaped members 5 into the spaces of the profiles 3 formed between the end walls 10 and the rear walls 11. The assembly of the profiles 3 and hook-shaped members 5 is then arranged with force such that duct wall 1 is pushed in the direction of the arrow shown in the figure between the first flanges 13 and the second flanges 17 of profiles 3. The duct wall 1 is moved against the bodies 51 of the hook-shaped members 5, wherein the envelope 57 is broken through. The paste 58 then closes round the edge of duct wall 1 against the hook-shaped members 5, wherein use is preferably made of a paste 58 curing on contact with air, so that the hook-shaped members 5 are placed leakage-free against the duct wall 1.

Figure 6:
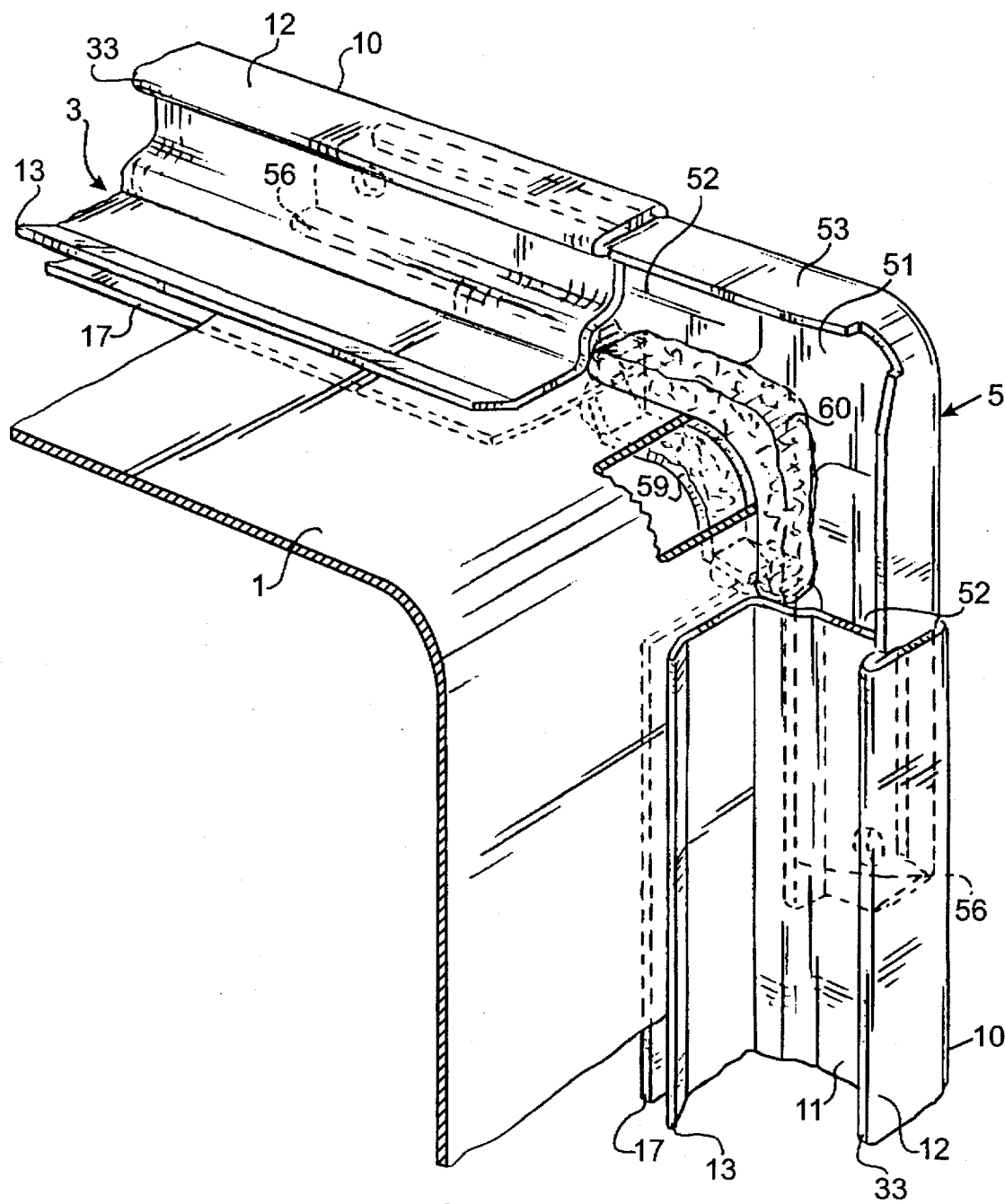
FIG. 6 shows a partly cut away perspective view of other embodiments of profiles and hook-shaped member according to the invention fixed to a duct wall.

Use is made for the embodiment of the device shown in FIG. 6 of another, simpler profile 3 than in the embodiments shown in the foregoing figures. The first flange 13 is single-walled and there is therefore no separation between the space in profile 3, where the duct wall 1 is located, and the space into which a leg 52 of the hook-shaped member 5 is inserted. However, due to close-fitting connection of the duct wall 1, the hook-shaped member 5 and profile 3 a gas-tight connection is obtained.

The embodiment of the hook-shaped member 5 shown in this figure differs further from the embodiments shown in foregoing figures in that the inner flange 59 does not extend any further than along the inner corner of the body 51 of the hook-shaped member 5 and in that use is made of hot-melt material with an envelope 60 formed by a powder layer. This embodiment of hook-shaped member 5 will be further described hereinbelow.

The duct wall 1 is located between the first flange 13 and the second flange 17 of profile 3. The end edge of duct wall 1 is placed in the hot-melt material with the powder layer 60 on the hook-shaped member 5 so that the duct wall 1 forms a gas-tight connection to the hook-shaped member 5. By fixing at least the second flange 17 to the duct wall 1, for instance by means of a number of point welds, the gas-tight connection of profile 3 and duct wall 1 is likewise effected.

Figure 7:
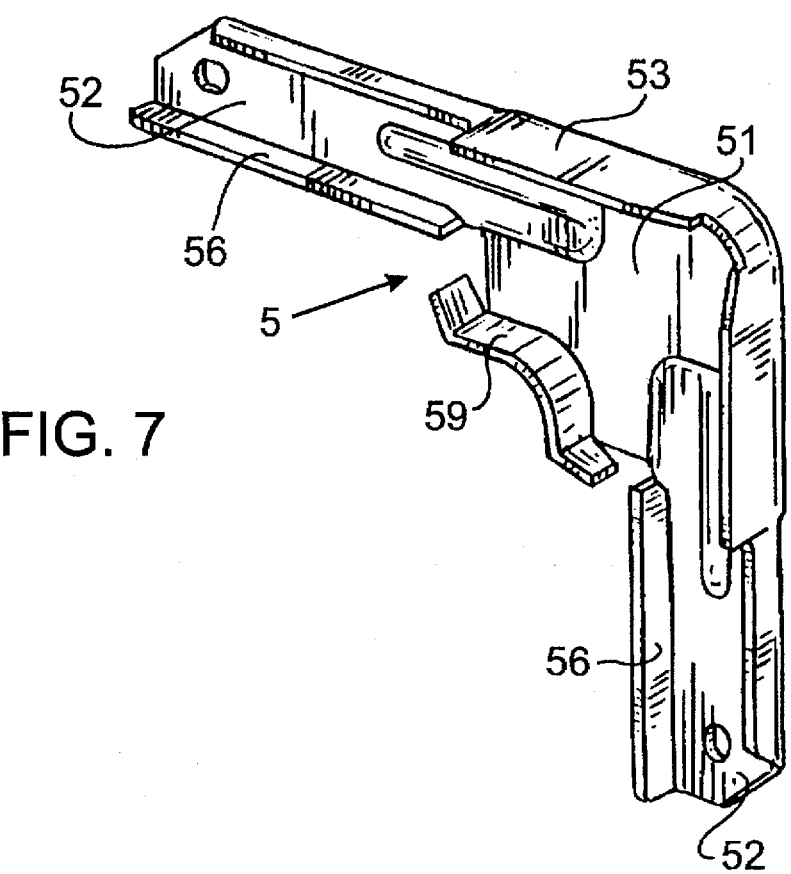
FIG. 7 is a perspective view of the embodiment of the hook-shaped member shown in FIG. 6.

Illustrated in FIG. 7 is the hook-shaped member 5 shown in FIG. 6. The inner flange 59 only extends along the inner corner of the body 51 of hook-shaped member 5 and forms a ridge on which the hot-melt material with the powder layer 60 can be arranged, as will be further described hereinbelow. In an assembled device the body 51 therefore extends in front of a corner in the duct wall 1.

Figure 8:
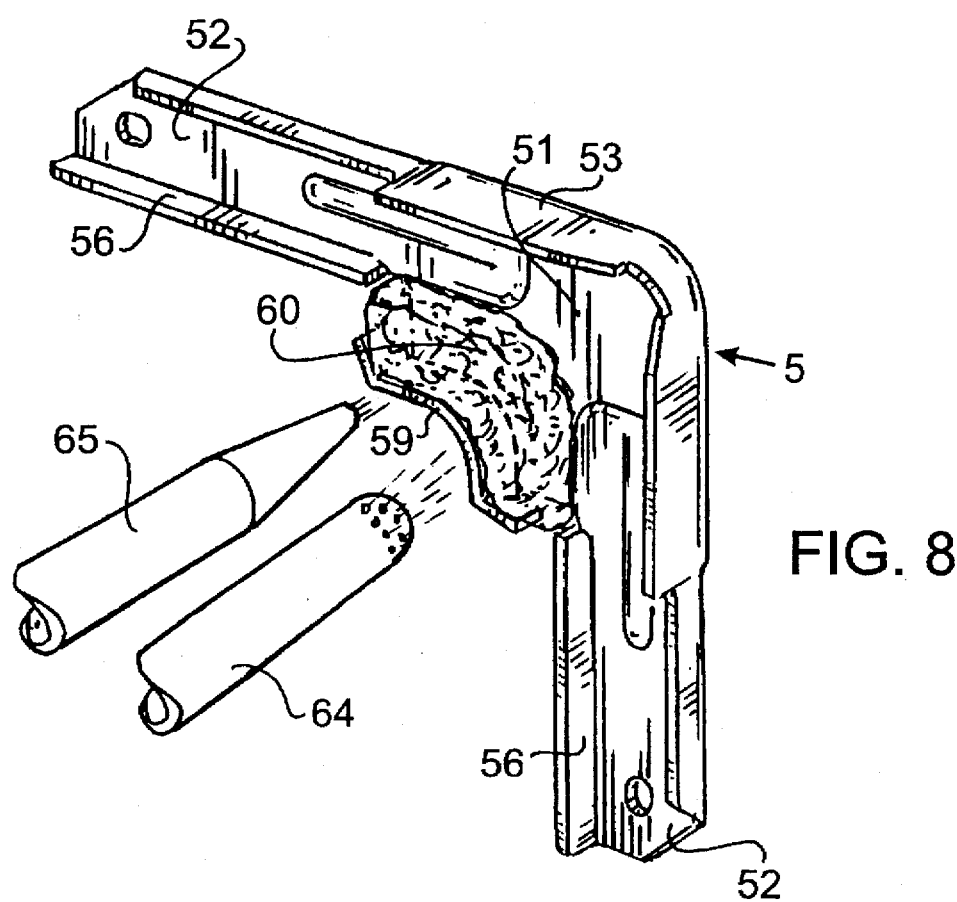
FIG. 8 is a perspective view of the embodiment of the hook-shaped member shown in FIG. 6 which elucidates the manner in which this latter is prepared for use.

Shown in FIG. 8 is the manner in which the hot-melt material, heated on the inner flange 59, is arranged against body 51. Use is made for this purpose of a nozzle 65 with which a desired quantity of hot-melt material 60 is heated and arranged on flange 59. The hot-melt material is heated so that it can be arranged in a condition with a high degree of malleability, and therefore in simple manner, on the hook-shaped member. When the hot-melt material cools it remains to some extent deformable but has above all the undesired property of being very sticky. In order to prevent problems resulting from this stickiness during assembly of the device, a layer of powder is applied to the hot-melt material using a sprinkler 64.

In another embodiment of the hook-shaped member 5 the inner corner of body 51 is not provided with a flange 54 or 59, wherein body 51 is again placed in front of a corner in the duct wall.

I claim:

1. Device for butt joining of ducts carrying gaseous medium and having a rectangular or square cross section, wherein a profile is fixed along the free end edges of each duct wall, which profile comprises: an end wall having a rear side and a from side disposed perpendicularly on the duct wall; a flange extending in a rearward direction relative to the end wall of the profile for engaging the duct wall, and a hook-shaped member including a body portion having a rear side, a front side and legs, the legs of which extend along the rear side of the end wall of the profile, characterized in that a deformable sealing means for sealing the duct ends is arranged on the rear side of the hook-shaped member, the rear side of the hook-shaped member facing toward the duct wall such that the duct wall may be sealingly connected to the hook-shaped member, and wherein the body portion of the hook-shaped member extends in front of the free end edge of the duct wall.

2. Device as claimed in claim 1, characterized in that the sealing means is formed by a flexible sealing strip.

3. Device as claimed in claim 1, characterized in that the hook-shaped member includes an inner flange arranged at a right angle to the body portion thereof, the inner flange extending into the interior of the duct.

4. Device as claimed in claim 3, characterized in that the inner flange extends in the interior of the duct space under a second flange of each profile.

5. A hook-shaped member suitable for use in a device for butt joining of first and second ducts, the hook-shaped member including a body portion having a rear side facing and adjacent to the first duct to be joined and a front side facing and adjacent to the second duct to be joined, characterized in that a deformable sealing means for sealing the duct ends is arranged on the rear side of the hook-shaped member between said rear side of the hook-shaped member and the first duct.

6. Hook-shaped member as claimed in claim 5, characterized in that the sealing means is formed by a strip of hot-melt material.

7. Hook-shaped member as claimed in claim 5, characterized in that the sealing means is covered by a layer of material in powder form.

8. Hook-shaped member as claimed in claim 5, characterized by a flange formed along the body portion of the hook-shaped member, wherein the sealing means makes contact with the flange.

9. Hook-shaped member as claimed in claim 5, said hook-shaped member further comprising legs extending from first and second ends of the body portion and characterized in that the sealing means extends along the body portion of said member no further than the beginning of said legs on each end thereof.

10. Hook-shaped member as claimed in claim 5, characterized in that the body portion of the hook-shaped member includes an inner flange arranged at a right angle to the body portion thereof, the inner flange extending into the interior of the duct.

11. Device for butt joining of ducts carrying gaseous medium and having a rectangular or square cross section, wherein a profile is fixed along the free end edges of a duct wall, which profile comprises: an end wall having a rear side and a front side disposed perpendicularly on the duct wall; a rear wall placed at a distance behind the rear side of the end wall; a first flange disposed above the duct wall; and a second flange disposed under the duct wall, an upper surface of the second flange for substantially the entire extent thereof engaging the duct wall such that the duct wall is held therebetween and the profile has a substantially L-shaped cross section, a hook-shaped member including a body portion and oppositely extending legs, the legs being inserted between the end wall and the rear wall of the profile, at least two mutually opposite hook-shaped members capable of being joined to each other, characterized in that the first flange is formed by upper and lower layers, the lower layer of which is connected to the second flange and the upper layer of which is connected to the rear wall, wherein a lower end of the end wall is connected to a rearward directed third flange which is disposed between the upper and lower layers of the first flange.

12. Device as claimed in claim 11, characterized in that the third flange includes a rear edge strip extending from a rear edge thereof and the upper layer of the first flange is provided with a bulge to form a chamber in which is received the edge strip of the third flange.

13. Device as claimed in claim 12, characterized in that the edge strip is connected at an angle to the rear edge of the third flange.

14. Device as claimed in claim 11, characterized in that a flexible sealing means for sealing the duct ends is arranged between the end edge of the duct, the first flange and the second flange.

15. Device as claimed in claim 11, characterized in that a sealing strip is arranged between the mutually facing end walls of two profiles which are fixed to two ducts for connecting.

* * * * *